US012402678B1

(12) United States Patent

Fan et al.

(10) Patent No.: US 12,402,678 B1

(45) Date of Patent: Sep. 2, 2025

(54) MAGNETICALLY-ATTRACTED QUICK CONNECTION DEVICE

(71) Applicant: Dongguan Chaodian E-commerce Co., Ltd., Dongguan (CN)

(72) Inventors: Zhexin Fan, Dongguan (CN); Yumei Wen, Dongguan (CN)

(73) Assignee: Dongguan Chaodian E-commerce Co., Ltd., Dongguan (CN)

( * ) Notice: Subject to any disclaimer, the term of this patent is extended or adjusted under 35 U.S.C. 154(b) by 0 days.

(21) Appl. No.: 19/021,259

(22) Filed: Jan. 15, 2025

(51) Int. Cl.
*A41F 1/00* (2006.01)
*H01F 7/02* (2006.01)

(52) U.S. Cl.
CPC ............ *A41F 1/002* (2013.01); *H01F 7/0263* (2013.01)

(58) Field of Classification Search
CPC ... A41F 1/002; H01F 7/0263; A44D 2203/00; Y10T 24/32; A44C 5/2061; A44C 5/2057; A44C 5/2076; A44B 11/2523; A44B 11/2534; A44B 11/2592
USPC ........................................................ 63/3.1, 900
See application file for complete search history.

(56) References Cited

U.S. PATENT DOCUMENTS 1,431,729 A * 10/1922 Fischer ................ A44C 5/2061 24/635
3,608,962 A * 9/1971 Knecht .............. A44B 11/2534 297/483
5,311,647 A * 5/1994 Levy ...................... A44C 5/208 24/616
5,410,785 A * 5/1995 Huang ............... A44B 11/2592 403/328
7,207,091 B2 * 4/2007 Dunaye ................ A44C 5/2071 24/303
7,564,331 B2 * 7/2009 Hashimoto .......... A44C 5/2042 335/207
7,824,083 B2 * 11/2010 Fullerton ............... G01D 18/00 362/217.13
10,722,005 B1 * 7/2020 DiPietro .............. A44C 5/2052
12,144,406 B2 * 11/2024 Decker ................ A44C 5/2071
2008/0016657 A1 * 1/2008 Bohm .................. A44C 5/2061 24/455
2008/0047111 A1 * 2/2008 Garber ................. A44C 5/2061 24/303

(Continued)

FOREIGN PATENT DOCUMENTS

GB 2268219 A * 1/1994 ............ A01K 91/03

*Primary Examiner* — Jason W San
*Assistant Examiner* — Rowland Do
(74) *Attorney, Agent, or Firm* — Hemisphere Law, PLLC; Zhigang Ma

(57) ABSTRACT

A magnetically-attracted quick connection device includes a female connecting head and a male connecting head; the male connecting head includes a male seat, a first magnet, limiting beads, a thrust ring, a spring and a male cover; the first magnet is installed at a front end of the male seat and inside the male seat, the thrust ring is installed at a rear end of the male seat, the limiting beads are located between the male seat and the thrust ring, the spring is installed between the thrust ring and the male cover, the female connecting head includes a female seat, a female magnet seat and a second magnet, and the second magnet attracts the first magnet to guide the male seat to be quickly inserted into a slot, which is beneficial to the rapid insertion of the male connecting head and the female connecting head without complete alignment.

6 Claims, 3 Drawing Sheets

(56) References Cited

U.S. PATENT DOCUMENTS

| | | | | |
|---|---|---|---|---|
| 2009/0276989 | A1* | 11/2009 | Mongkhonpradit | A44C 5/2061 24/595.1 |
| 2010/0308605 | A1* | 12/2010 | Fiedler | E05B 47/004 292/251.5 |
| 2013/0185901 | A1* | 7/2013 | Heyman | A44B 99/00 24/303 |
| 2014/0268714 | A1* | 9/2014 | Hui | F21V 21/00 362/208 |
| 2016/0058136 | A1* | 3/2016 | Ng | A44C 11/002 63/23 |
| 2019/0017535 | A1* | 1/2019 | Ormsbee | F16B 1/00 |
| 2020/0229549 | A1* | 7/2020 | Heineke | F16B 5/0628 |

* cited by examiner

MAGNETICALLY-ATTRACTED QUICK CONNECTION DEVICE

CROSS-REFERENCE TO RELATED APPLICATION

This application claims priority to Chinese Patent Application No. 2024228033429, filed Nov. 8, 2024, which is herein incorporated by reference in its entirety.

TECHNICAL FIELD

The disclosure relates to a magnetically-attracted quick connection device.

BACKGROUND

In the prior art, a tail of a role-playing cloth mainly adopts three kinds of connection mechanisms. The first type is a hanging buckle type, the main structure of the hanging buckle type is a ring buckle hanging on a belt, and this structure has the disadvantages of simple design, slow speed, inability to quickly align and inaccuracy. The second type is an anal plug type, the main structure of the anal plug type is to define an assembly hole on an anal plug and a corresponding assembly part is provided on the tail for connection, which is usually a threaded connection. The disadvantage of this structure is that disassembly and assembly require slow tightening of screws, which is inconvenient. The third type is an optical axis type, and a silicone tail structure is integrally molded on a shaft.

SUMMARY

In view of the above defects in the prior art, the disclosure provides a magnetically-attracted quick connection device suitable for the tail connection of role-playing clothes, and the specific technical scheme is as follows.

A magnetically-attracted connection device includes a female connecting head and a male connecting head capable of inserting into the female connecting head; the male connecting head includes a male seat, a first magnet, multiple limiting beads, a thrust ring, a spring and a male cover; the first magnet is installed at a front end of the male seat and inside the male seat, the thrust ring is installed at a rear end of the male seat, the multiple limiting beads are located between the male seat and the thrust ring, and the spring is installed between the thrust ring and the male cover; the female connecting head includes a female seat, a female magnet seat and a second magnet, the female seat defines a slot, the female magnet seat is installed at an end of the slot, the second magnet is installed inside the female magnet seat, the second magnet is matched with the first magnet to guide the male seat to be quickly inserted into the slot, and the spring drives the thrust ring to move forward to make the multiple limiting beads abut against an inner wall of the female seat.

In an embodiment, the male connecting head further includes a first screw, a head part of the first screw abuts against the first magnet, and a rod part of the first screw passes through an inner wall of the male seat and is threaded with the male cover.

In an embodiment, a front end of the thrust ring is provided with multiple limiting blocks, every adjacent two of the multiple limiting blocks defines a limiting groove, a rear end of the male seat is provided with multiple inserting plates matched with the multiple limiting grooves, the multiple limiting blocks are circumferentially arranged around a central axis of the thrust ring to form a central groove, and the male seat is provided with a cylinder inserted into the central groove.

In an embodiment, each limiting block is provided with a limiting step abutting against a corresponding one of the multiple limiting beads.

In an embodiment, the spring is sleeved on an outer peripheral side of the cylinder, an end of the spring abuts against the thrust ring and the other end of the spring abuts against the male cover.

In an embodiment, the female connecting head further includes a second screw and a nut, a head part of the second screw abuts against the second magnet, and a rod part of the second screw passes through the female seat and the female magnet seat and is threaded with the nut.

The beneficial effects of the disclosure are as follows: through the cooperation of the second magnet and the first magnet, the male connecting head is guided to be quickly inserted into the slot, which is beneficial to the rapid insertion of the male connecting head and the female connecting head, the male connecting head can be inserted into the female connecting head without complete alignment, which is convenient to use and can realize blind insertion. Moreover, after insertion, the spring drives the thrust ring to move forward, so that the limiting beads abut against the inner wall of the female connecting head, preventing the female connecting head and the male connecting head from accidentally falling off and separating, making the connection structure more stable and meeting the tail installation requirements of role-playing clothes.

DETAILED DESCRIPTION OF EMBODIMENTS

Figure 1:
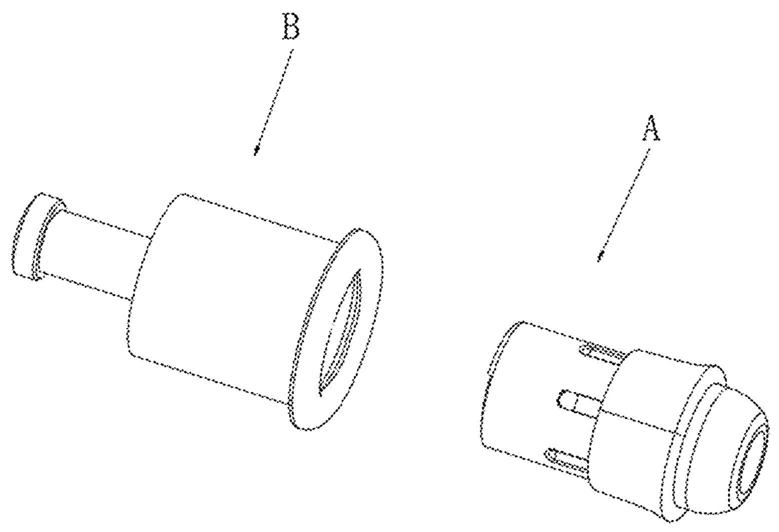
FIG. 1 illustrates a schematic structural diagram of a magnetically-attracted quick connection device of the disclosure.
Figure 2:
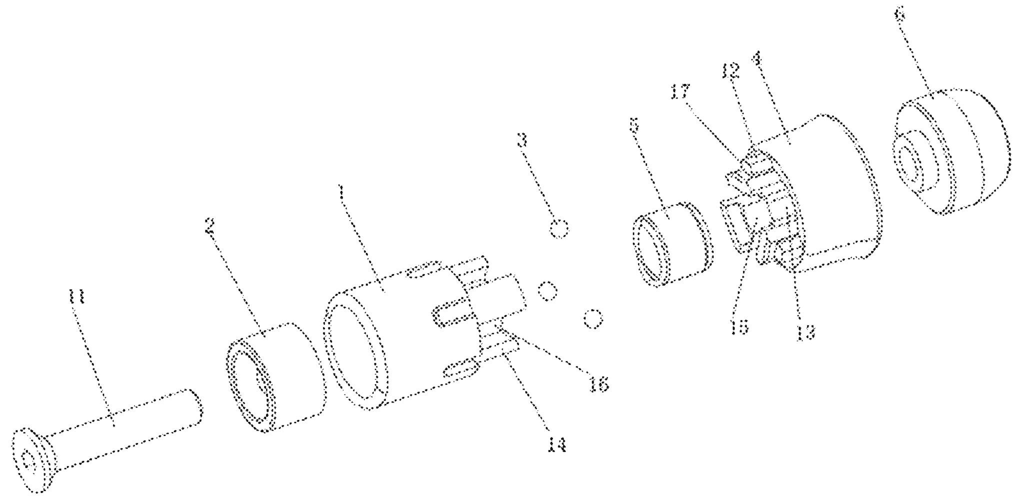
FIG. 2 illustrates an exploded diagram of a male connecting head of the disclosure.
Figure 3:
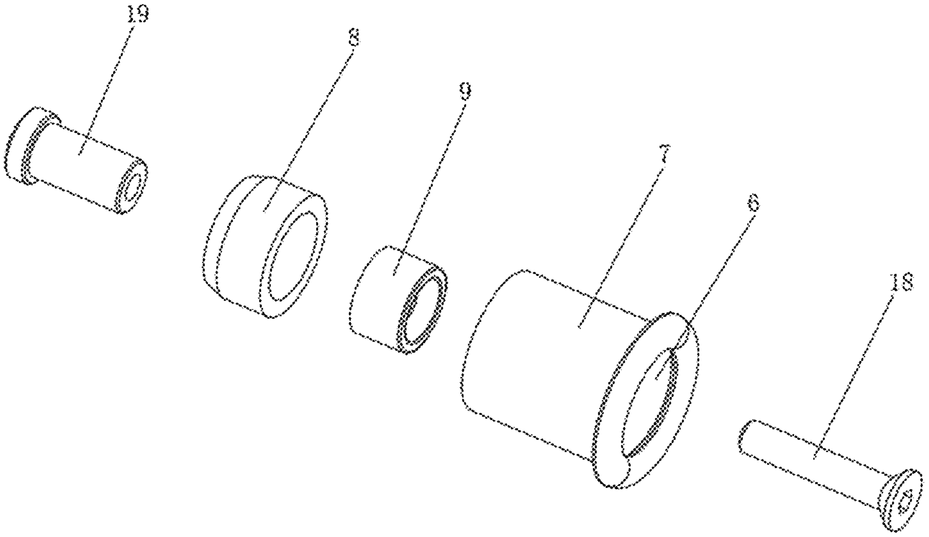
FIG. 3 illustrates an exploded diagram of a female connecting head of the disclosure.
Figure 4:
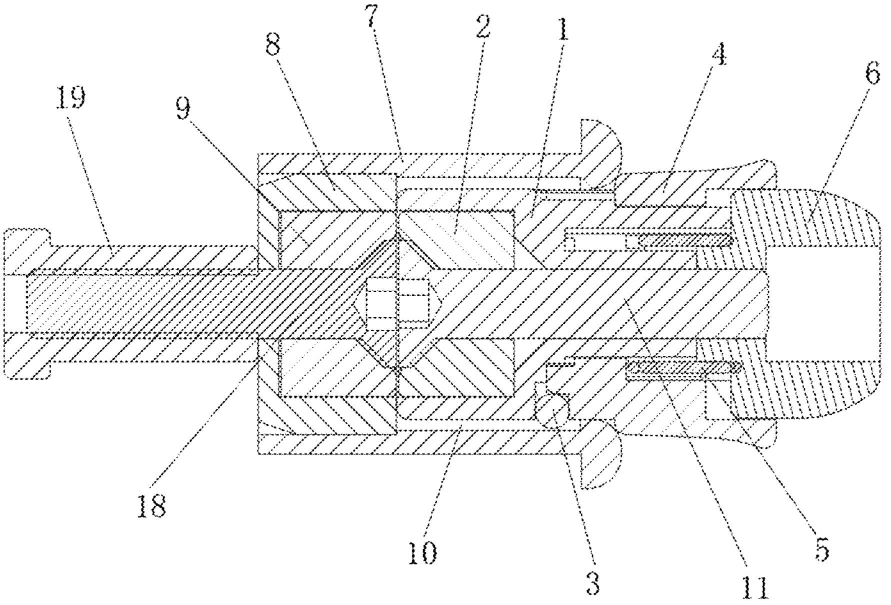
FIG. 4 illustrates a schematic sectional diagram of the magnetically-attracted quick connection device of the disclosure.

The specific embodiments of the disclosure will be further explained in conjunction with the accompanying drawings.

In the description of the disclosure, it should be noted that terms such as "center", "up", "down", "left", "right", "vertical", "horizontal", "in", and "out" refer to the directions or positional relationships as shown in the accompanying drawings. These terms are used solely for the purpose of describing the disclosure and simplifying the description, and do not indicate or imply that the devices or components referred to must have specific orientations or be constructed and operated in specific directions. Therefore, they should not be understood as limitations on the disclosure.

In the description of the disclosure, it should be noted that unless otherwise specifically defined and limited, terms such as "installed", "provided with" and "connected" should be broadly understood. For example, "connected" can mean a rigid connection, a detachable connection, or being formed as one piece; it can be a mechanical connection or an electrical connection; it can be a direct connection or an indirect connection through an intermediary; it can be an internal connection within two components. For those skilled in the art, the specific meaning of the aforementioned terms in the context of the disclosure can be understood based on the specific circumstances.

As shown in FIGS. 1-4, a magnetically-attracted quick connection device includes a male connecting head A and a female connecting head B, and the male connecting head A can be inserted into the female connecting head B. The male connecting head A includes a male seat 1, a first magnet 2, limiting beads 3, a thrust ring 4, a spring 5 and a male cover 6. The first magnet 2 is installed at the front end of the male seat 1 and inside the male seat 1, and the thrust ring 4 is installed at the rear end of the male seat 1. The number of the limiting beads 3 is multiple, and the multiple limiting beads 3 are located between the male seat 1 and the thrust ring 4. The spring 5 is installed between the thrust ring 4 and the male cover 6. The female connecting head B includes a female seat 7, a female magnet seat 8 and a second magnet 9, the female seat 7 defines a slot 10, the female magnet seat 8 is installed at the end of the slot 10, and the second magnet 9 is installed inside the female magnet seat 8. The second magnet 9 attracts the first magnet 2 to guide the male seat 1 to be quickly inserted into the slot 10, and the spring 5 drives the thrust ring 4 to move forward to make the limiting beads 3 abut against the inner wall of the female seat 7.

Specifically, the male connecting head A further includes a first screw 11, the head part of the first screw 11 abuts against the first magnet 2, and the rod part of the first screw 11 passes through the inner wall of the male seat 1 and then is threaded with the male cover 6.

Figure 5:
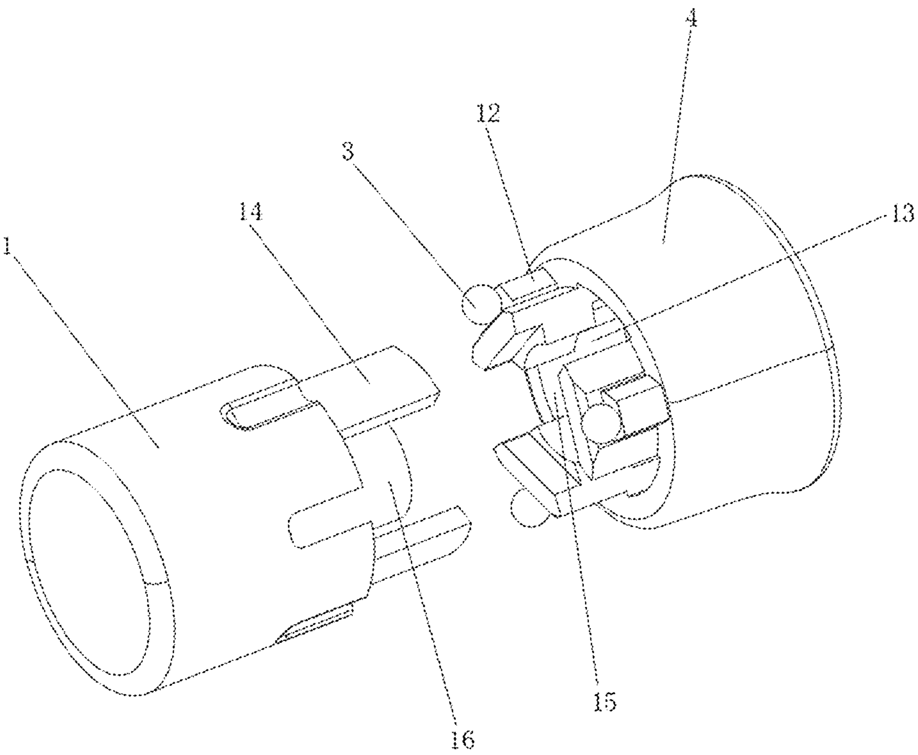
FIG. 5 illustrates a perspective view of a male seat, limiting beads and a thrust ring of the disclosure.

As shown in FIG. 5, multiple limiting blocks 12 are arranged in front of the thrust ring 4, and every two adjacent limiting blocks 12 define a limiting groove 13. Multiple inserting plates 14 matched with the limiting grooves 13 are arranged behind the male seat 1. The multiple limiting blocks 12 are circumferentially arranged around the central axis of the thrust ring 4 to form a central groove 15, the male seat 1 is provided with a cylinder 16 inserted into the central groove 15, and each limiting block 12 is provided with a limiting step 17 abutting against the corresponding limiting bead 3. The spring 5 is sleeved on the outer peripheral side of the cylinder 16. An end of the spring 5 abuts against the thrust ring 4 and the other end of the spring 5 abuts against the male cover 6. Under normal conditions, the spring 5 drives the thrust ring 4 to move forward, and the limiting steps 17 of the thrust ring 4 abut against the limiting beads 3, so that the limiting beads 3 can limit the male connecting head from pulling out. When the male connecting head and the female connecting head are to be disassembled, the thrust ring 4 is pulled back to make the limiting steps 17 not abut against the limiting beads 3.

Specifically, the female connecting head B further includes a second screw 18 and a nut 19, the head part of the second screw 18 abuts against the second magnet 9, and the rod part of the second screw 18 passes through the female seat 7 and the female magnet seat 8 and is threaded with the nut 19.

The above content is a further detailed description of the disclosure in combination with the specific preferred embodiments, and it cannot be considered that the embodiments of the disclosure are limited to these descriptions. For those skilled in the related art, some simple deductions or substitutions can be made without departing from the concept of the disclosure, which should be regarded as belonging to the protection scope of the disclosure.

What is claimed is:

1. A magnetically-attracted connection device, comprising a female connecting head and a male connecting head inserted into the female connecting head;

wherein the male connecting head comprises a male seat, a first magnet, a plurality of limiting beads, a thrust ring, a spring and a male cover, the first magnet is installed at a front end of the male seat and inside the male seat, the thrust ring is installed at a rear end of the male seat, the plurality of limiting beads are located between the male seat and the thrust ring, and the spring is installed between the thrust ring and the male cover; and wherein the female connecting head comprises a female seat, a female magnet seat and a second magnet, the female seat defines a slot, the female magnet seat is installed at an end of the slot, the second magnet is installed inside the female magnet seat, the second magnet is configured to attract the first magnet to guide the male seat to be inserted into the slot, and the spring is configured to drive the thrust ring to move forward to make the plurality of limiting beads abut against an inner wall of the female seat.

2. The magnetically-attracted connection device as claimed in claim 1, wherein the male connecting head further comprises a first screw, a head part of the first screw abuts against the first magnet, and a rod part of the first screw passes through an inner wall of the male seat and is threaded with the male cover.

3. The magnetically-attracted connection device as claimed in claim 1, wherein a front end of the thrust ring is provided with a plurality of limiting blocks, every adjacent two of the plurality of limiting blocks defines a limiting groove, a rear end of the male seat is provided with a plurality of inserting plates matched with the plurality of limiting grooves, the plurality of limiting blocks are circumferentially arranged around a central axis of the thrust ring to form a central groove, and the male seat is provided with a cylinder inserted into the central groove.

4. The magnetically-attracted connection device as claimed in claim 3, wherein each limiting block is provided with a limiting step abutting against a corresponding one of the plurality of limiting beads.

5. The magnetically-attracted connection device as claimed in claim 1, wherein the spring is sleeved on an outer peripheral side of the cylinder, an end of the spring abuts against the thrust ring and the other end of the spring abuts against the male cover.

6. The magnetically-attracted connection device as claimed in claim 1, wherein the female connecting head further comprises a second screw and a nut, a head part of the second screw abuts against the second magnet, and a rod part of the second screw passes through the female seat and the female magnet seat and is threaded with the nut.

* * * * *